(12) United States Patent
Sakakibara

(10) Patent No.: US 8,264,859 B2
(45) Date of Patent: Sep. 11, 2012

(54) DIRECT POWER CONVERTING APPARATUS

(75) Inventor: Kenichi Sakakibara, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 379 days.

(21) Appl. No.: 12/666,603

(22) PCT Filed: Aug. 6, 2008

(86) PCT No.: PCT/JP2008/064125
§ 371 (c)(1),
(2), (4) Date: Dec. 23, 2009

(87) PCT Pub. No.: WO2009/020152
PCT Pub. Date: Feb. 12, 2009

(65) Prior Publication Data
US 2010/0321965 A1    Dec. 23, 2010

(30) Foreign Application Priority Data
Aug. 7, 2007    (JP) .................. 2007-205602

(51) Int. Cl.
*H02J 3/36* (2006.01)
(52) U.S. Cl. ...................... 363/35; 363/56.05
(58) Field of Classification Search ................ 363/35, 363/56.02, 56.05
See application file for complete search history.

(56) References Cited

U.S. PATENT DOCUMENTS

| | | | |
|---|---|---|---|
| 6,185,115 B1 * | 2/2001 | Sul et al. ................ | 363/37 |
| 6,995,992 B2 | 2/2006 | Wei et al. | |
| 7,135,835 B2 | 11/2006 | Yamada et al. | |
| 2005/0099829 A1 | 5/2005 | Wei et al. | |

FOREIGN PATENT DOCUMENTS

| | | |
|---|---|---|
| JP | 60-13485 A | 1/1985 |
| JP | 62-53918 B2 | 11/1987 |
| JP | 2-65667 A | 3/1990 |
| JP | 4-69096 A | 3/1992 |
| JP | 7-255179 A | 10/1995 |
| JP | 2000-341967 A | 12/2000 |
| JP | 2002-238260 A | 8/2002 |
| JP | 2006-54947 A | 2/2006 |
| JP | 2008-79381 A | 4/2008 |

OTHER PUBLICATIONS

J. Schoenberger et al., "An Ultra Sparse Matrix Converter with a Novel Active Clamp Circuit", Proc. of the 4th power conversion conference (PCC '07), pp. 784-791.

* cited by examiner

*Primary Examiner* — Shawn Riley
(74) *Attorney, Agent, or Firm* — Birch, Stewart, Kolasch & Birch, LLP

(57) ABSTRACT

A transistor is brought into conduction when, for example, a voltage between both ends of a second clamp capacitor exceeds a predetermined reference voltage. A resistance value of a discharge resistor is smaller than a value obtained by dividing the reference voltage by the maximum value of a current flowing through the discharge resistor. When the transistor is brought into conduction as a result of a voltage between both ends of the second clamp capacitor exceeding the predetermined reference voltage, a voltage applied to the discharge resistor, which results from a regenerative current, is larger one of the voltage between both ends of the second clamp capacitor and a voltage drop of the discharge resistor due to the regenerative current. The voltage drop and the voltage between both ends are smaller than a voltage between DC power supply lines, whereby it is possible to reduce an electrostatic capacitance of the discharge resistor.

13 Claims, 9 Drawing Sheets

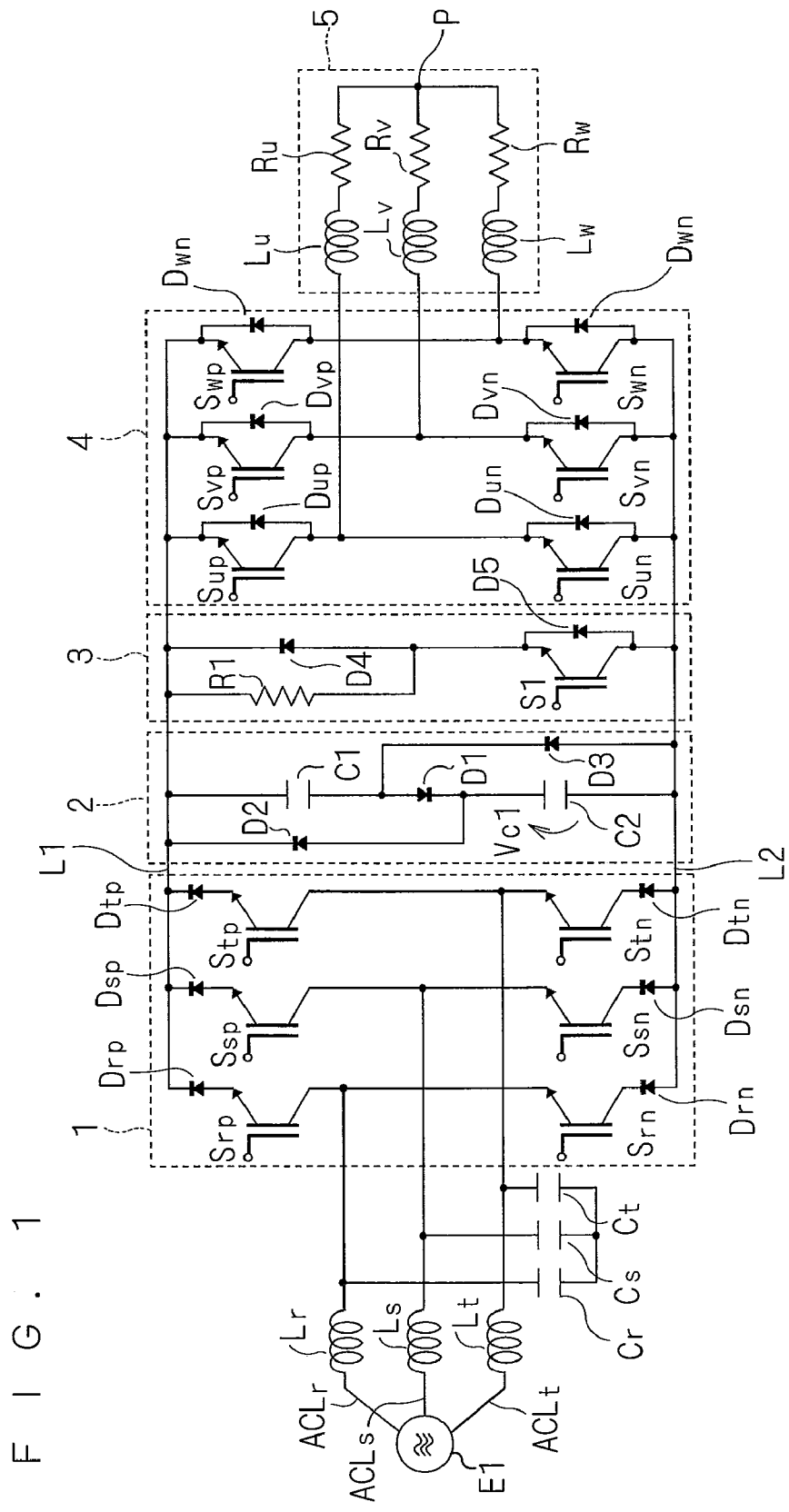
F I G . 1

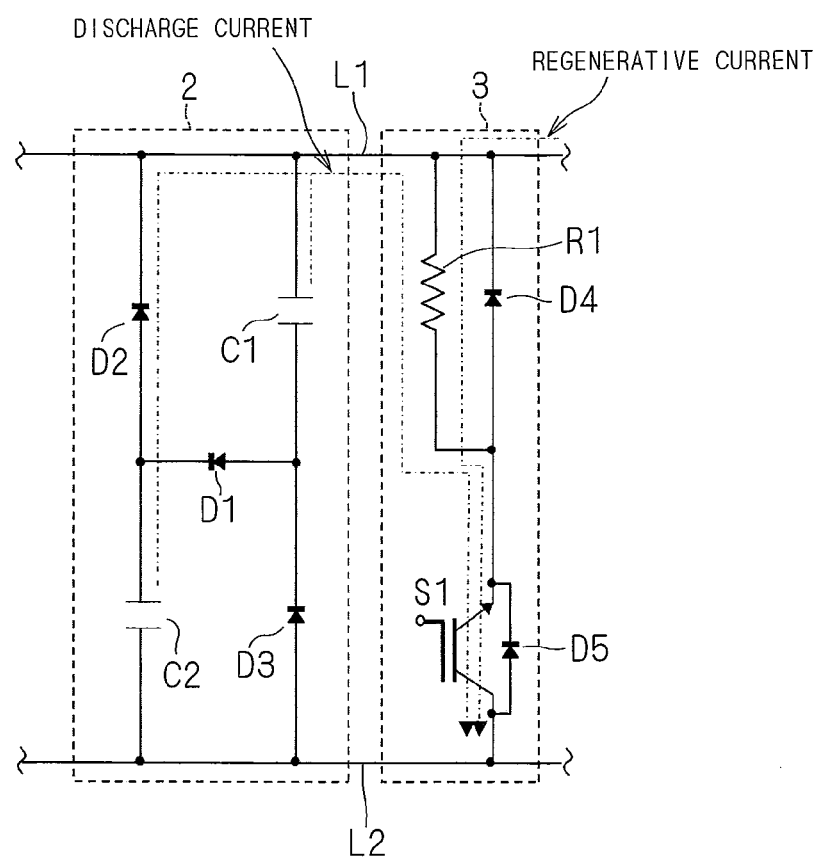
F I G . 4

F I G. 8
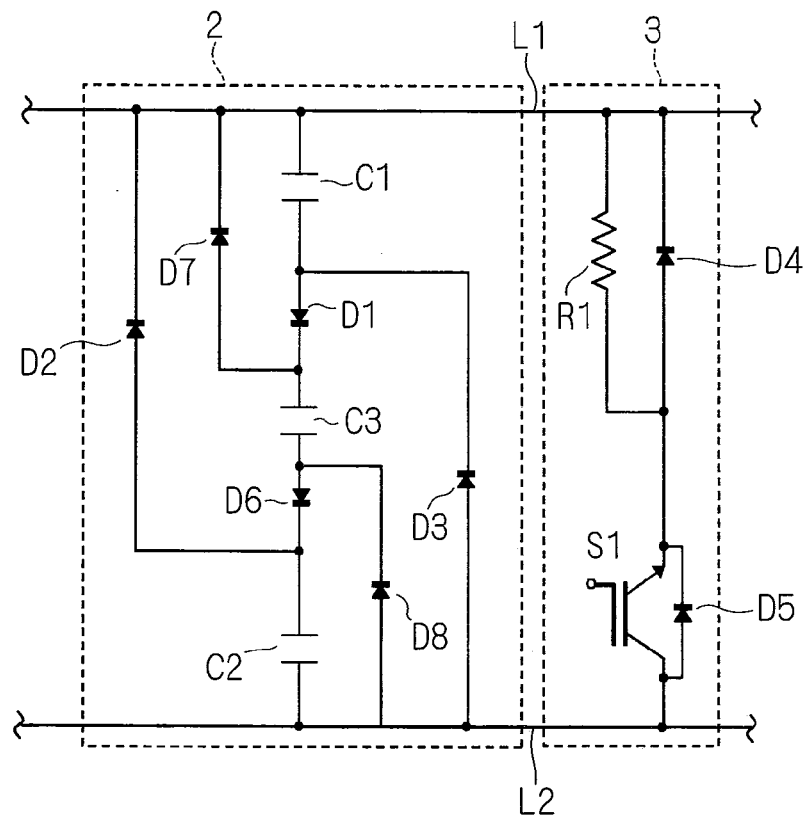

DIRECT POWER CONVERTING APPARATUS

TECHNICAL FIELD

The present invention relates to a direct power converting apparatus, and more particularly, to a direct power converting apparatus including a clamp circuit in a DC link section.

BACKGROUND ART

Non-Patent Document 1, which will be described below, discloses a direct AC power converting apparatus including a clamp circuit. FIG. 9 shows the direct AC power converting apparatus described in Non-Patent Document 1. It is assumed here that an IPM motor is provided on an output side of this direct AC power converting apparatus. When La represents an inductance per phase which corresponds to an average value of effective inductances of the IPM motor, i represents overload current which serves as a reference for interrupting current supply to the IPM motor, Vc represents voltage between both ends of a clamp capacitor, Cc represents electrostatic capacitance of the clamp capacitor, and Vs represents line voltage of a three-phase AC power supply, and when all power stored in an inductor for three phases of the IPM motor is regenerated to the clamp capacitor, the following relational expression is satisfied.

[Expression 1]

$$\frac{1}{2}La\left(i^2 + \left(\frac{i}{2}\right)^2 + \left(\frac{i}{2}\right)^2\right) = \frac{1}{2}Cc\left(Vc^2 - \left(\sqrt{2}\,Vs\right)^2\right) \quad (1)$$

Therefore, the voltage between both ends of the clamp capacitor is expressed by the following expression.

[Expression 2]

$$Vc = \sqrt{\frac{3}{2}\frac{La}{Cc}i^2 + 2Vs^2} \quad (2)$$

FIG. 10 shows the relationship between voltage between both ends and electrostatic capacitance of the clamp capacitor, which is based on Expression (2). For example, if the power supply voltage Vs is 400 V, the inductance La is 12 mH, the overload current i is 40 A, and the electrostatic capacitance of the clamp capacitor is 10 μF, the voltage Vc between both ends of the clamp capacitor is approximately 1,800 V. The voltage value exceeds device rating 1,200 V of a transistor and a diode with power supply voltage of 400 V class.

In order to keep the voltage Vc between both ends of the clamp capacitor at approximately 750 V or lower, the electrostatic capacitance of the clamp capacitor needs to be 200 μF or larger from Expression (2) and FIG. 10.

On the other hand, inrush current at power-on increases as the electrostatic capacitance of the clamp capacitor is increased. Here, a series circuit in which a power supply, a reactor, a resistor and a capacitor are connected in series is taken as an example of a series circuit for one phase, where L represents an inductance of the reactor, R represents a resistance value of the resistor, and C represents electrostatic capacitance of the clamp capacitor. Then, a transfer characteristic of output (current) to input (power supply voltage Vs) in the series circuit is expressed by the following expression.

[Expression 3]

$$G(s) = \frac{ic}{Vs} = sC\frac{1/LC}{s^2 + sR/L + 1/LC} \quad (3)$$

The response to step input is expressed by the following expression.

[Expression 4]

$$G(s) = sC\frac{1/LC}{s^2 + sR/L + 1/LC}\frac{1}{s} = \frac{1/L}{s^2 + sR/L + 1/LC} \quad (4)$$

Here, Expression (4) is subjected to inverse Laplace transform to obtain the response of current assuming that 1/L=D, R/L=E and 1/LC=F, the following expression is derived.

[Expression 5]

$$i(t) = \frac{D}{\omega}e^{-\alpha}\sin\omega t \quad (5)$$

[Expression 6]

$$\omega = \frac{\sqrt{4F - E^2}}{2},\ \sigma = \frac{E}{2} \quad (6)$$

F decreases as the electrostatic capacitance C of the capacitor increases, and D and E remain constant irrespective of the electrostatic capacitance C, and thus ω decreases as the electrostatic capacitance C of the capacitor increases. Accordingly, an amplitude term D/ω excluding attenuation through time increases as the electrostatic capacitance C of the capacitor increases. That is, inrush current increases along with an increase in electrostatic capacitance C of the capacitor.

When the maximum value of current is obtained assuming that a value obtained by differentiating i(t) with respect to time is 0 (i(t)'=0) from Expression (5), the following expression is derived.

[Expression 7]

$$t = \frac{\pi - \alpha}{\omega} \quad (7)$$

The maximum value is regarded as inrush current. FIG. 11 shows the relationship between inrush current (i((π−α)/ω)) and the electrostatic capacitance C.

As described above, the voltage between both ends of the clamp capacitor charged with the regenerative current is approximately equal to or lower than 750 V, and accordingly if the electrostatic capacitance of the clamp capacitor is 200 the maximum value (inrush current) of current reaches 150 A from Expressions (6) and (7) and FIG. 11.

In Non-Patent Document 1, for reducing the above-mentioned inrush current and also reducing the voltage between both ends of the clamp capacitor charged with the regenerative current, a discharge circuit is provided in the clamp capacitor. More specifically, the discharge circuit includes a discharge resistor connected in parallel with the clamp capacitor. The inrush current is reduced by reducing the electrostatic capacitance of the clamp capacitor, and charges charged in the clamp capacitor are discharged to the discharge resistor when the voltage between both ends of the clamp capacitor exceeds a predetermined reference voltage due to the regenerative current, whereby the voltage between both ends is suppressed from increasing.

Note that Patent Documents 1 to 4 disclose the technologies related to the present invention.

Non-Patent Document 1: J. Schoenberger, T. Friedli, S. D. Round, J. W. Kolar, "An ultra sparse matrix converter with a novel active clamp circuit", Proc. of the 4th power conversion conference (PCC '07), pp. 784-791

Patent Document 1: U.S. Pat. No. 6,995,992

Patent Document 2: Japanese Patent Application Laid-Open No. 2006-54947

Patent Document 3: Japanese Patent Application Laid-Open No. 02-65667

Patent Document 4: Japanese Patent Publication No. 62-53918

DISCLOSURE OF INVENTION

Problem to be Solved by the Invention

However, in the technology described in Non-Patent Document 1, approximately same amount of voltage as the voltage between both ends (=reference voltage) of the clamp capacitor is applied to the discharge resistor, and hence the discharge resistor requires power capacity equal to or more than (reference voltage)×(reference voltage)/(resistance value).

An object of the present invention is therefore to provide a direct power converting apparatus capable of reducing power capacity required by a discharge resistor.

Means to Solve the Problem

According to a first aspect of the present invention, a direct power converting apparatus includes: a positive-side DC power supply line (L1); a negative-side DC power supply line (L2) to which a potential lower than a potential applied to the positive-side DC power supply line is applied; input capacitors (Cr, Cs, Ct) each connected between ones of a plurality of input lines connected to a multi-phase AC power supply and functioning as a power supply; a current-source power converter (1) converting a multi-phase AC voltage input from the input lines into a square-wave-shape DC voltage having two potentials, and supplying the positive-side DC power supply line and the negative-side DC power supply line with the DC voltage; a voltage-source power converter (4) converting the DC voltage having two potentials between the positive-side DC power supply line and the negative-side DC power supply line into a square-wave-shape AC voltage, and outputting the square-wave-shape AC voltage to an inductive multi-phase load (5); a first capacitance device (C1) having one end connected to the positive-side DC power supply line; a second capacitance device (C2) connected to another end of the first capacitance device and the negative-side DC power supply line; a first diode device (D1) having, between the first capacitance device and the second capacitance device, an anode connected to the first capacitance device and a cathode connected to the second capacitance device; a second diode device (D2) having an anode connected to a point between the second capacitance device and the first diode device and a cathode connected to the positive-side DC power supply line; a third diode device (D3) having an anode connected to the negative-side DC power supply line and a cathode connected to a point between the first capacitance device and the first diode; a discharge resistor (R1) connected between the positive-side DC power supply line and the negative-side DC power supply line; and a switching device (S1) connected in series with the discharge resistor between the positive-side DC power supply line and the negative-side DC power supply line, being brought into conduction when a voltage (Vc1) between both ends of the first capacitance device or the second capacitance device exceeds a first predetermined value (Vref-h), and being interrupted when the voltage falls below a second predetermined value (Vref-L).

According to a second aspect of the direct power converting apparatus of the present invention, in the direct power converting apparatus according to the first aspect, a resistance value of the discharge resistor (R1) is equal to or smaller than a value obtained by dividing the predetermined value (Vref-h) by a maximum value of a current flowing through the discharge resistor.

According to a third aspect of the direct power converting apparatus of the present invention, in the direct power converting apparatus according to the first or second aspect, which further includes: a third capacitance device (C3) connected between the first diode device (D1) and the second capacitance device (C2); a fourth diode device (D6) having, between the second capacitance device and the third capacitance device, an anode connected to the third capacitance device and a cathode connected to the second capacitance device and the second diode device (D2); a fifth diode device (D7) having an anode connected to a point between the first diode device and the third capacitance device and a cathode connected to the positive-side DC power supply line; and a sixth diode device (D8) having an anode connected to the negative-side DC power supply line and a cathode connected to a point between the fourth diode device and the third capacitance device.

According to a fourth aspect of the direct power converting apparatus of the present invention, in the direct power converting apparatus according to any one of the first to third aspects, the voltage-source power converter and the switching device are composed of a power integrated module (PIM).

Effects of the Invention

According to the first aspect of the direct power converting apparatus of the present invention, the first capacitance device and the second capacitance device are charged with a regenerative current from the inductive multi-phase load. In this case, the first capacitance device and the second capacitance device are charged in the state of being connected in series with each other by rectifying functions of the first diode device to the third diode device (see FIG. 3). The first capacitance device and the second capacitance device divide a voltage between the positive-side DC power supply line and the negative-side DC power supply line, whereby it is possible to reduce the breakdown voltages of the first capacitance device and the second capacitance device.

Then, the switching device is brought into conduction when the voltage between both ends of the first capacitance device or the second capacitance device exceeds the first predetermined value. On this occasion, the first capacitance device and the second capacitance device are discharged in the state of being connected in parallel with each other to the discharge resistor by the rectifying functions of the first diode device to the third diode device (see FIG. 4). The first capacitance device and the second capacitance device are discharged in this manner, whereby it is possible to suppress the voltage between both ends of the first capacitance device and the voltage between both ends of the second capacitance device from increasing due to the regenerative current.

Further, it is possible to apply, to the discharge resistor, the voltages between both ends of a pair of the first capacitance device and the second capacitance device. Accordingly, compared with a mode in which one clamp capacitor is provide between a positive-side DC power supply line and a negative-side DC power supply line, the electrostatic capacitance required by a discharge resistor can be reduced.

According to the second aspect of the direct power converting apparatus of the present invention, the voltage between both ends of the discharging resistor when the switching device is brought into conduction and thus the largest current flows through the discharging resistor is smaller than the first predetermined value. The voltage between both ends is equal to the voltages between both ends of the first capacitance device and the second capacitance device. Therefore, even in a case where the voltages between both ends are the largest (the largest current flows through the discharge resistor), the switching device can be prevented from being in conduction for a long period of time, and accordingly a time rating of the switching device can be reduced.

According to the third aspect of the direct power converting apparatus of the present invention, in conduction of the switching device, the first capacitance device to the third capacitance device are discharged to the discharge resistor in the state of being connected in parallel with each other by the rectifying functions of the first diode device to the sixth diode device. Accordingly, compared with the case where the first capacitance device to the third capacitance device are discharged in the state of being connected in series with each other, the power capacity of the discharge resistor can be reduced further.

According to the fourth aspect of the direct power converting apparatus of the present invention, the voltage-source power converter and the switching device can be manufactured integrally, and thus are widely used in an indirect AC power converting apparatus. Accordingly, the direct power converting apparatus can be configured to be compact in size at low cost.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a conceptual configuration diagram of a motor driving device.

FIG. 4 is a diagram showing a state in which the clamp capacitor is discharged.

FIG. 8 is a conceptual configuration diagram of a clamp circuit included in a motor driving device according to a third embodiment.

BEST MODE FOR CARRYING OUT THE INVENTION

First Embodiment

Figure 2:
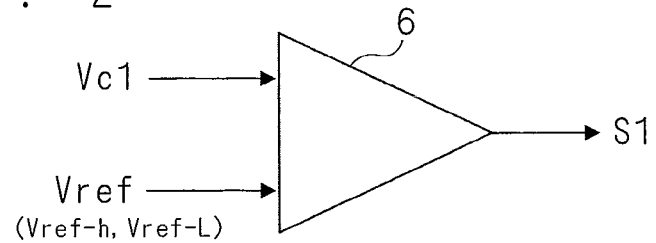
FIG. 2 is a conceptual configuration diagram of a circuit for outputting a switch signal to a transistor included in a brake circuit.

FIG. 1 is a conceptual configuration diagram of a motor driving device as an example of a direct power converting apparatus according to a first embodiment of the present invention. The motor driving device includes a power supply E1, input lines ACLr, ACLs and ACLt, reactors Lr, Ls and Lt, capacitors Cr, Cs and Ct, a current-source converter 1, DC power supply lines L1 and L2, a clamp circuit 2, a brake circuit 3, a voltage-source inverter 4 and a motor 5.

The power supply E1 is a multi-phase AC power supply, which is, for example, a three-phase AC power supply, and supplies the input lines ACLr, ACLs and ACLt with three-phase AC current.

The reactors Lr, Ls and Lt are provided on the input lines ACLr, ACLs and ACLt, respectively.

Each of the capacitors Cr, Cs and Ct is connected between ones of the input lines ACLr, ACLs and ACLt. That is, the capacitor Cr is provided between the input lines ACLr and ACLs, the capacitor Cs is provided between the input lines ACLs and ACLt, and the capacitor Ct is provided between the input lines ACLt and ACLr. More specifically, one ends thereof are connected to the reactors Lr, Ls and Lt on a side opposite to the power supply E1, and the other ends thereof are connected to each other. Those are provided on an input side of the current-source converter 1 and function as a voltage source. The capacitors Cr, Cs and Ct constitute an LC filter which suppresses switching current, together with the reactors Lr, Ls and Lt.

Figure 5:
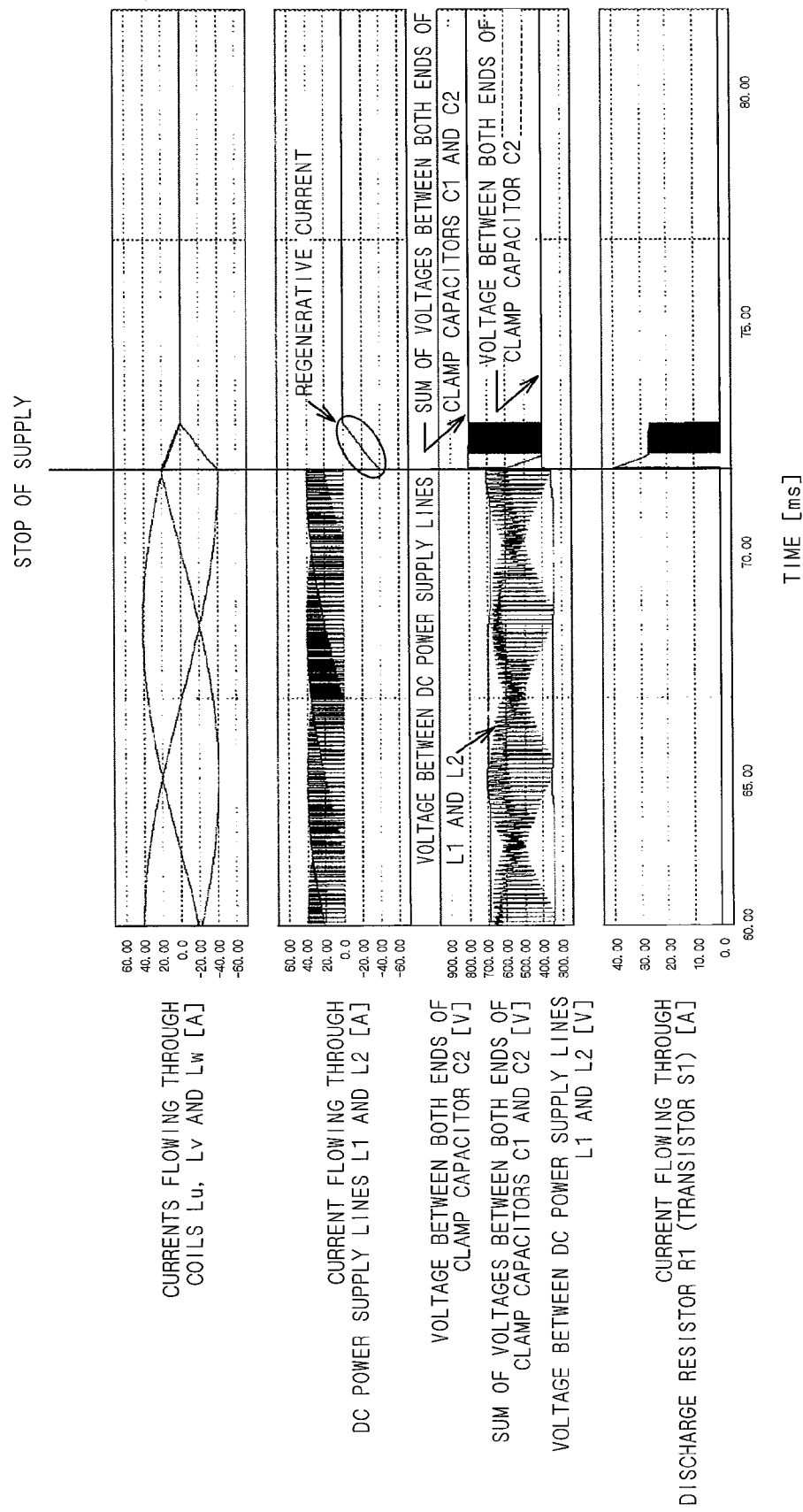
FIG. 5 is a graph showing currents flowing through coils included in a motor, currents flowing through DC power supply lines, voltage between both ends of one clamp capacitor, voltages between both ends of a pair of clamp capacitors, voltage between the DC power supply lines, and current flowing through a discharge resistor (transistor) in a motor driving device according to a first embodiment.

The current-source converter 1 is connected to the power supply E1 via the LC filter, and converts a multi-phase AC voltage input from the input lines ACLr, ACLs and ACLt into a square-wave-like DC voltage having two potentials to supply the DC voltage between the DC power lines L1 and L2 (see voltage wave form between the DC power supply lines L1 and L2 of FIGS. 5 to 7, which will be described below).

More specifically, the current-source converter 1 includes transistors Sip, Sm, Ssp, Ssn, Stp and Stn, and diodes Drp, Drn, Dsp, Dsn, Dtp and Dtn.

Respective cathodes of the diodes Drp, Dsp and Dtp are connected to the DC power supply line L1. Respective anodes of the diodes Dm, Dsn and Dtn are connected to the DC power supply line L2.

Emitters of the transistors Srp, Ssp and Stp are connected to anodes of the diodes Drp, Dsp and Dtp, respectively. Collectors of the transistors Sm, Ssn and Stn are connected to cathodes of the diodes Dm, Dsn and Dtn, respectively. A collector of the transistor Srp and an emitter of the transistor Sm, a collector of the transistor Ssp and an emitter of the transistor Ssn, and a collector of the transistor Stp and an emitter of the transistor Stn are connected in common to the input lines ACLr, ACLs and ACLt, respectively.

Respective bases of those transistors Srp, Sm, Ssp, Ssn, Stp and Stn are supplied with a switch signal by a control section (not shown) or the like, and the current-source converter 1 converts the three-phase AC voltage into a square-wave-shape DC voltage having two potentials. Note that the DC power supply line L1 is regarded as a positive-side DC power supply line, and the DC power supply line L2 is regarded as a negative-side DC power supply line to which a potential lower than a potential applied to the DC power supply line L1 is applied.

The clamp circuit 2 includes at least two clamp capacitors. Those two clamp capacitors are charged in a state of being connected in series with each other so as to have a voltage higher than the higher potential of the square-wave-shape voltage, and are discharged in a state of being connected in parallel with each other so as to have a voltage lower than the lower potential of the square-wave-shape voltage. In this manner, the clamp circuit acts in a steady state, through the above-mentioned charging/discharging operation, so as to balance a voltage when the discharge current is higher than the charge current. More specifically, the clamp circuit 2 includes clamp capacitors C1 and C2 and diodes D1 to D3.

The clamp capacitor C1 has one end connected to the DC power supply line L1. The clamp capacitor C2 is connected to the other end of the clamp capacitor C1 and the DC power supply line L2. That is, the clamp capacitors C1 and C2 are connected in series with each other between the DC power supply lines L1 and L2.

Between the clamp capacitors C1 and C2, the diode D1 has an anode and a cathode connected to the clamp capacitor C1 and the clamp capacitor C2, respectively. The diode D2 has an anode connected to a point between the clamp capacitor C2 and the diode D1 and a cathode connected to the DC power supply line L1. The diode D3 has an anode connected to the DC power supply line L2 and a cathode connected to a point between the clamp capacitor C1 and the diode D1.

The brake circuit 3 includes a discharge resistor R1, a transistor S1 and diodes D4 and D5. The discharge resistor R1 is connected between the DC power supply lines L1 and L2. The transistor S1 is connected in series with the discharge resistor R1. The diode D4 has an anode connected to a point between the discharge resistor R1 and the transistor S1 and a cathode connected to the DC power supply line L1. The diode D5 has an anode connected to an emitter of the transistor S1 and a cathode connected to a collector of the transistor S1.

The transistor S1 is brought into conduction when at least any of the voltages between both ends of the clamp capacitors C1 and C2 exceeds a predetermined value. For example, FIG. 2 shows an example of a circuit for outputting a switch signal to the transistor S1. A differential amplifier 6 has a non-inverting input terminal to which a voltage Vc1 between both ends of the clamp capacitor 2 is applied and an inverting input terminal to which a reference voltage Vref (though not shown herein, the differential amplifier has hysteresis characteristics of reference voltages Vref-h and Vref-L based on the reference voltage) serving as a reference of the predetermined value is applied. An output of the differential amplifier 6 is input to a base of the transistor S1 as a switch signal.

A resistance value r1 of the discharge resistor R1 is smaller than a value obtained by dividing a value, which is obtained by multiplying the reference voltage Vref-h by the number of the clamp capacitors C1 and C2, by the maximum value Imax of the current flowing through the discharge resistor R1. That is, $r1 < 2 \cdot Vref\text{-}h/Imax$ (hereinafter, referred to as Expression (8)) is satisfied. This will be described below in detail.

The voltage-source inverter 4 converts the square-wave-shape DC voltage having two potentials between the DC power supply lines L1 and L2 into a square-wave-shape AC voltage and outputs the square-wave-shape AC voltage to the motor 5. More specifically, the voltage-source inverter 4 includes transistors Sup, Sun, Svp, Svn, Swp and Swn and diodes Dup, Dun, Dvp, Dvn, Dwp and Dwn.

Respective collectors of the transistors Sup, Svp and Swp and respective cathodes of the diodes Dup, Dvp and Dwp are connected to the DC power supply line L1, and respective emitters of the transistors Sun, Svn and Swn and respective anodes of the diodes Dun, Dvn and Dwn are connected to the DC power supply line L2.

An emitter of the transistor Sup, a collector of the transistor Sun, an anode of the diode Dup and a cathode of the diode Dun are connected in common to the motor 5, an emitter of the transistor Svp, a collector of the transistor Svn, an anode of the diode Dvp and a cathode of the diode Dvn are connected in common to the motor 5, and an emitter of the transistor Swp, a collector of the transistor Swn, an anode of the diode Dwp and a cathode of the diode Dwn are connected in common to the motor 5.

Bases of those transistors Sup, Sun, Svp, Svn, Swp and Swn are supplied with the switch signal by the control section (not shown) or the like, and the voltage-source inverter 4 converts the square-wave-shape DC voltage having two potentials between the DC power supply lines L1 and L2 into a square-wave-shape AC voltage and outputs the square-wave-shape AC voltage to the motor 5.

The motor 5 is, for example, a three-phase AC motor, and an inductance component and a resistance component thereof are represented by coils Lu, Lv and Lw, and resistors Ru, Rv and Rw, respectively. The coils Lu, Lv and Lw are connected in series with the resistors Ru, Rv and Rw, respectively. One ends of the coils Lu, Lv and Lw on a side opposite to the resistors Ru, Rv and Rw are connected to a point between the transistors Sup and Sun, between the transistors Svp and Svn, and between the transistors Swp and Swn, respectively. One ends of the resistors Ru, Rv and Rw on a side opposite to the coils Lu, Lv and Lw are connected in common at a neutral point P.

The motor 5 is supplied with the square-wave-shape AC voltage from the voltage-source inverter 4. Thanks to the inductance component of the motor 5, an AC current for driving the motor 5 is smoothed. In other words, the motor 5 converts the square-wave-shape AC voltage supplied from the voltage-source inverter 4 into the AC current.

The capacitors Cr, Cs and Ct are charged with this AC current flowing through the motor 5 via the voltage-source inverter 4 and the current-source converter 1, which is converted into the AC voltage. In other words, the motor 5 is regarded also as a current source for the current-source converter 1.

According to the clamp circuit 2 of the motor driving device having the above-mentioned configuration, in a case where the current flowing through the motor 5 delays with respect to the voltage between the DC power supply lines L1 and L2 due to a load power factor of the side of the voltage-source inverter 4, during a predetermined period of time, a reflux current flows from the motor 5 to the DC power supply lines L1 and L2, whereby the clamp capacitors C1 and C2 are charged in the state of being connected in series with each other. The charging voltage (voltages between both ends of a pair of the clamp capacitors C1 and C2) on this occasion is also determined based on the load power factor. On the other hand, when the voltages between both ends of the clamp capacitors C1 and C2 rise to exceed the lower voltage of the square-wave-shape voltage between the DC power supply lines L1 and L2, the clamp capacitors C1 and C2 are discharged in the state of being connected in parallel with each other. Note that the clamp capacitors C1 and C2 are charged in the sate of being connected in series with each other and discharged in the state of being connected in parallel with each other, and thus the discharging voltage is a half of the charging voltage.

Through the charging/discharging operation as described above, the voltages of the clamp capacitors C1 and C2 are balanced in a case where the discharging current is larger than the charging current.

As described above, the reflux current of the motor 5 is charged, and is discharged again to be supplied to the motor 5, with the result that the motor 5 is driven efficiently. In addition, the clamp circuit 2 does not require a so-called active device such as a switching device, whereby power consumption and manufacturing cost are reduced.

Figure 3:
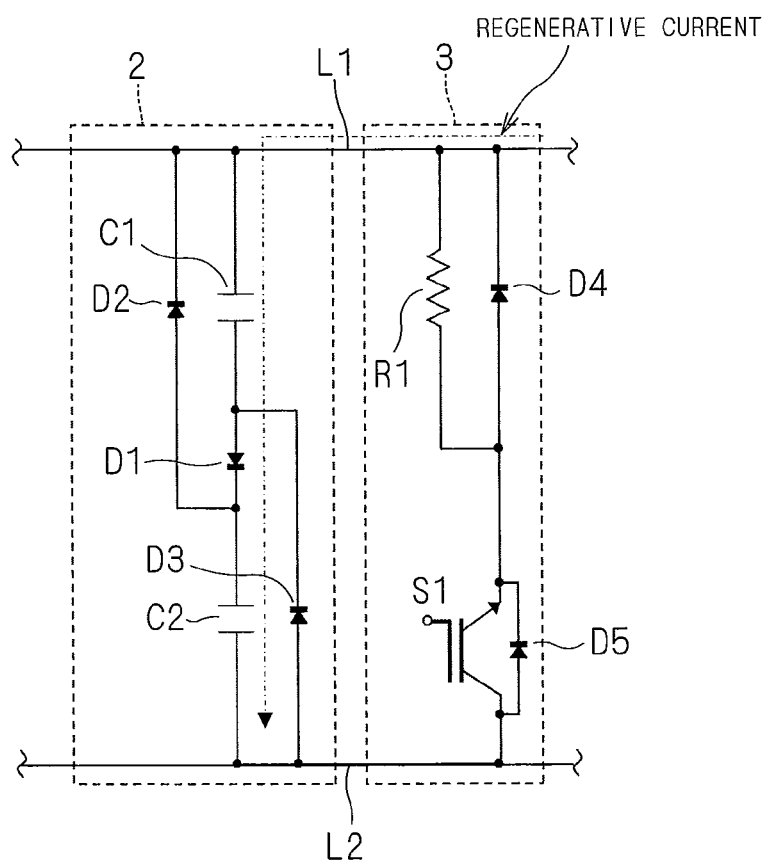
FIG. 3 is a diagram showing a state in which a clamp capacitor is charged.

Further, in a case where an operating current to the motor 5 is reduced (the motor 5 is decelerated) or in a case where supply of the operating current to the motor 5 is stopped, the regenerative current from the motor 5 is supplied to the clamp capacitors C1 and C2. Also in this case, the clamp capacitors C1 and C2 are charged in the state of being connected in series with each other. FIG. 3 shows a state in which the clamp capacitors C1 and C2 are charged when the regenerative current flows. The clamp capacitors C1 and C2 divide a voltage between the DC power supply lines L1 and L2, which reduces breakdown voltages of the clamp capacitors C1 and C2.

Further, as described above, the voltages between both ends of the clamp capacitors C1 and C2 rise to exceed the lower potential of the square-wave-shape voltage, the clamp capacitors C1 and C2 are discharged on, for example, the motor 5 side. In this case, the clamp capacitors C1 and C2 are discharged in the state of being connected in parallel with each other by rectifying functions of the diodes D1 to D3.

Hereinafter, specific description will be given of a case where the operation of the voltage-source inverter 4 is stopped for protecting the motor 5 from overload to stop current supply to the motor 5 when, for example, the operating current to be supplied to the motor 5 exceeds a predetermined value.

As a specific operation example, a case where the power supply voltage Vs of the power supply E1 is 400 V, the maximum value Imax of the regenerative current is 40 A, the resistance value r1 of the discharge resistor R1 is 15Ω, and the reference voltage Vref-h is 400 V will be described. Note that those satisfy Expression (8). FIG. 4 shows a state in which the clamp capacitors C1 and C2 are discharged. FIG. 5 shows currents flowing through the coils Lu, Lv and Lw, currents flowing through the DC power supply lines L1 and L2, a voltage between both ends of the clamp capacitor C2, a sum of voltages between both ends of the clamp capacitors C1 and C2, a voltage between the DC power supply lines L1 and L2, and a current flowing through the discharge resistor R1 (transistor S1).

For example, in a case where supply from the power supply E1 is stopped for stopping current supply to the motor 5 (see time 70 ms of FIG. 5), the regenerative current from the motor 5 flows through the DC power supply lines L1 and L2 (see FIG. 5), and the regenerative current is supplied to the clamp capacitors C1 and C2. In this case, the clamp capacitors C1 and C2 are charged in the state of being connected in series with each other, whereby the voltages between both ends of the clamp capacitors C1 and C2 rise (see FIG. 3 and FIG. 5).

Then, the transistor S1 is brought into conduction when, for example, the voltage Vc1 between both ends of the clamp capacitor C2 exceeds the reference voltage Vref-h. Note that the reference voltage Vref-h (400 V) is set to a value larger than the voltage Vc1 (approximately 350 V) between both ends of the clamp capacitor C2 in driving the motor 5. If the transistor S1 is brought into conduction, the clamp capacitors C1 and C2 are not discharged, whereby all of the regenerative current flows through the brake circuit 3. Specific description thereof will be given below. Note that description will be given regardless of voltage drop of the transistor S1 for the sake of simplicity.

A voltage drop Vr1 of the discharge resistor R1, which is caused when the regenerative current flows through the discharge resistor R1, is obtained by multiplying the resistance value r1 of the discharge resistor R1 by the regenerative current. Assuming that the regenerative current is almost the same as Imax at the time when the transistor S1 is brought into conduction first, Vr1=r1·Imax=600 V.

On the other hand, the voltages between both ends of the clamp capacitors C1 and C2 are each 400 V (equal to the reference voltage Vref-h). The sum of the voltages between both ends of the clamp capacitors C1 and C2 is 800 V, and the voltage drop Vr1 in the case where all of the regenerative current flows through the discharge resistor R1 is 600 V, and thus the relationship between the regenerative current and the discharge resistor R1 becomes dominant. More specifically, the regenerative current flowing through the discharge resistor R1 does not flow through the clamp capacitors C1 and C2 but flows into the discharge resistor R1. In other words, the resistance value r1 satisfies Expression (8), whereby it is possible to prevent the clamp capacitors C1 and C2 to be charged with the regenerative current.

The clamp capacitors C1 and C2 are discharged in the state of being connected in parallel with each other, and in this case, the voltages between both ends (=reference voltage) of the clamp capacitors C1 and C2 are smaller than the voltage drop Vr1 of the discharge resistor R1. Accordingly, the clamp capacitors C1 and C2 are not discharged.

Then, the voltage drop Vr1 decreases along with a decrease in regenerative current (see the voltage between the DC power supply lines L1 and L2 of FIG. 5), and when the voltage drop Vr1 falls below the voltages between both ends of the clamp capacitors C1 and C2, discharging of the clamp capacitors C1 and C2 to the discharge resistor R1 is started (see FIG. 4 and FIG. 5).

After that, the transistor S1 is brought into non-conduction when the voltage Vc1 between both ends of the clamp capacitor C2 falls below the reference voltage Vref-L, and the regenerative current flows through the clamp capacitors C1 and C2, whereby these are charged. Then, the transistor S1 is brought into conduction when the voltage Vc1 between both ends of the clamp capacitor C2 again exceeds the reference voltage Vref-h, whereby the clamp capacitors C1 and C2 are discharged.

As described above, it is possible to consume regenerative energy due to the regenerative current while preventing the voltages between both ends of the clamp capacitors C1 and C2 from rising due to the regenerative current.

Further, in a mode in which one clamp capacitor is provided between DC power supply lines, a voltage same as the voltage between the DC power supply lines L1 and L2 (=voltage between both ends of one clamp capacitor, which is 800 V under the above-mentioned conditions) is applied to the discharge resistor R1 when the transistor S1 is brought into conduction. On the other hand, in this motor driving device, the voltage drop Vr1 of the discharge resistor R1 is lower than this voltage (for example, 800 V) as described above. Accordingly, it is possible to reduce the power capacity required by the discharge resistor R1 with the same resistance value.

Second Embodiment

A conceptual configuration diagram of a motor driving device according to a second embodiment of the present invention is the same as that of FIG. 1. In this motor driving device, the transistor S1 is in conduction during a period of time in which the voltage Vc1 between both ends of the clamp capacitor C2 exceeds the reference voltage Vref-h. Accordingly, the longer this period of time is, the larger time rating the transistor S1 requires. Therefore, in the motor driving device according to the second embodiment, the period of time in which the current keeps flowing through the transistor S1 is reduced, whereby the time rating required by the transistor S1 is reduced.

The resistance value r1 of the discharge resistor R1 is a value equal to or smaller than a value obtained by dividing the reference voltage Vref-h by the maximum value Imax of the current flowing through the discharge resistor R1. That is, $r1 \leq Vref\text{-}h/Imax$ (hereinafter, referred to as Expression (9)) is satisfied.

Figure 6:
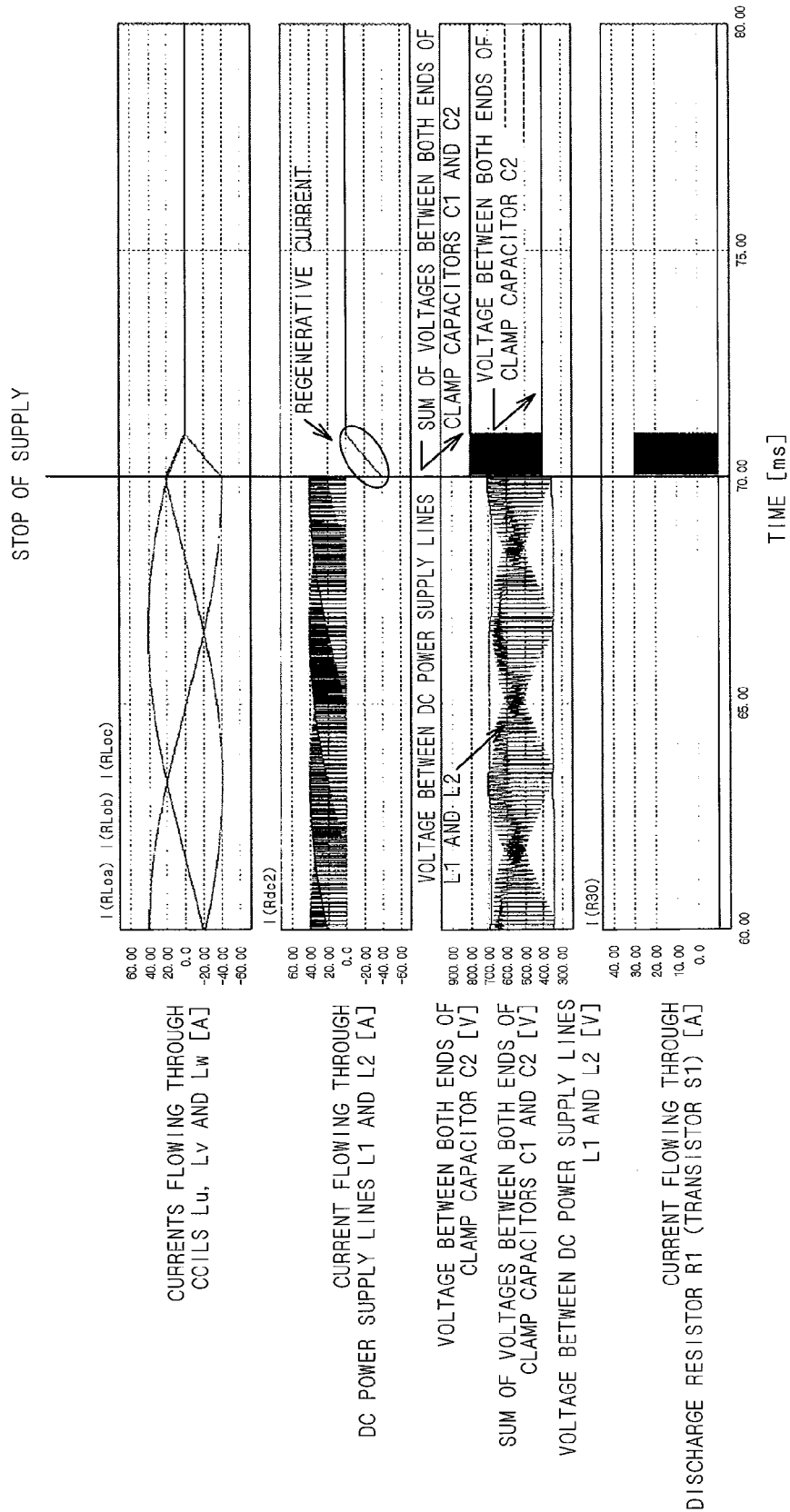
FIG. 6 is a graph showing currents flowing through coils included in a motor, currents flowing through DC power supply lines, voltage between both ends of one clamp capacitor, voltages between both ends of a pair of clamp capacitors, voltage between the DC power supply lines, and current flowing through a discharge resistor (transistor) in a motor driving device according to a second embodiment.

FIG. 6 shows the currents flowing through the coils Lu, Lv and Lw, the current flowing through the DC power supply lines L1 and L2, the voltage between both ends of the clamp capacitor C2, the sum of the voltages between both ends of the clamp capacitors C1 and C2, the voltage between the DC power supply lines L1 and L2 and the current flowing through the discharge resistor R1 (transistor S1) when, for example, the operation of the voltage-source inverter 4 is stopped for stopping current supply to the motor 5.

Note that FIG. 6 shows the results in a case where the power supply voltage Vs of the power supply E1 is 400 V, the maximum value Imax of the regenerative current is 40 A, the resistance value r1 of the discharge resistor R1 is 10Ω, and the reference voltage Vref-h is 400 V, which satisfy Expression (9).

Description will be given in comparison with FIG. 5. In FIG. 5, the resistance value r1 is 15Ω and the maximum value Imax of the regenerative current is 40 A, and thus the voltage drop Vr1 of the discharge resistor R1 when the transistor S1 is brought into conduction first is 600 V, which is larger than 400 V (voltages between both ends of the clamp capacitors C1 and C2) of the reference voltage Vref-h. Therefore, the clamp capacitors C1 and C2 are not discharged until the voltage drop Vr1 falls below the voltages between both ends of the clamp capacitors C1 and C2, whereby the transistor S1 is in conduction for a long period of time.

In the second embodiment, the voltage drop Vr1 of the discharge resistor R1, which results from the regenerative current at the time when the transistor S1 is brought into conduction first, is 400 V (=10Ω×40 A), which is the same as the voltages between both ends of the clamp capacitors C1 and C2. The voltage drop Vr1 decreases along with a decrease in regenerative current, and thus the voltage drop Vr1 falls below the voltages between both ends of the clamp capacitors C1 and C2 immediately after the transistor S1 is brought into conduction first. Accordingly, discharging of the clamp capacitors C1 and C2 to the discharge resistor R1 is started.

After that, as in the first embodiment, the transistor S1 repeats conduction and non-conduction based on, for example, the voltage Vc1 between both ends of the clamp capacitor C2.

As described above, the resistance value r1 of the discharge resistor R1 is equal to or smaller than the value obtained by dividing the reference voltage Vref-h by the maximum value $T_{max}$ of the regenerative current, and thus discharging of the clamp capacitors C1 and C2 is started immediately after the conduction of the transistor S1, which reduces the period of time in which the transistor S1 is in conduction.

Further, the voltage drop Vr1 of the discharge resistor R1 is equal to or smaller than the reference voltage Vref-h, and thus the power capacity required by the discharge resistor R1 can be reduced further.

Figure 7:
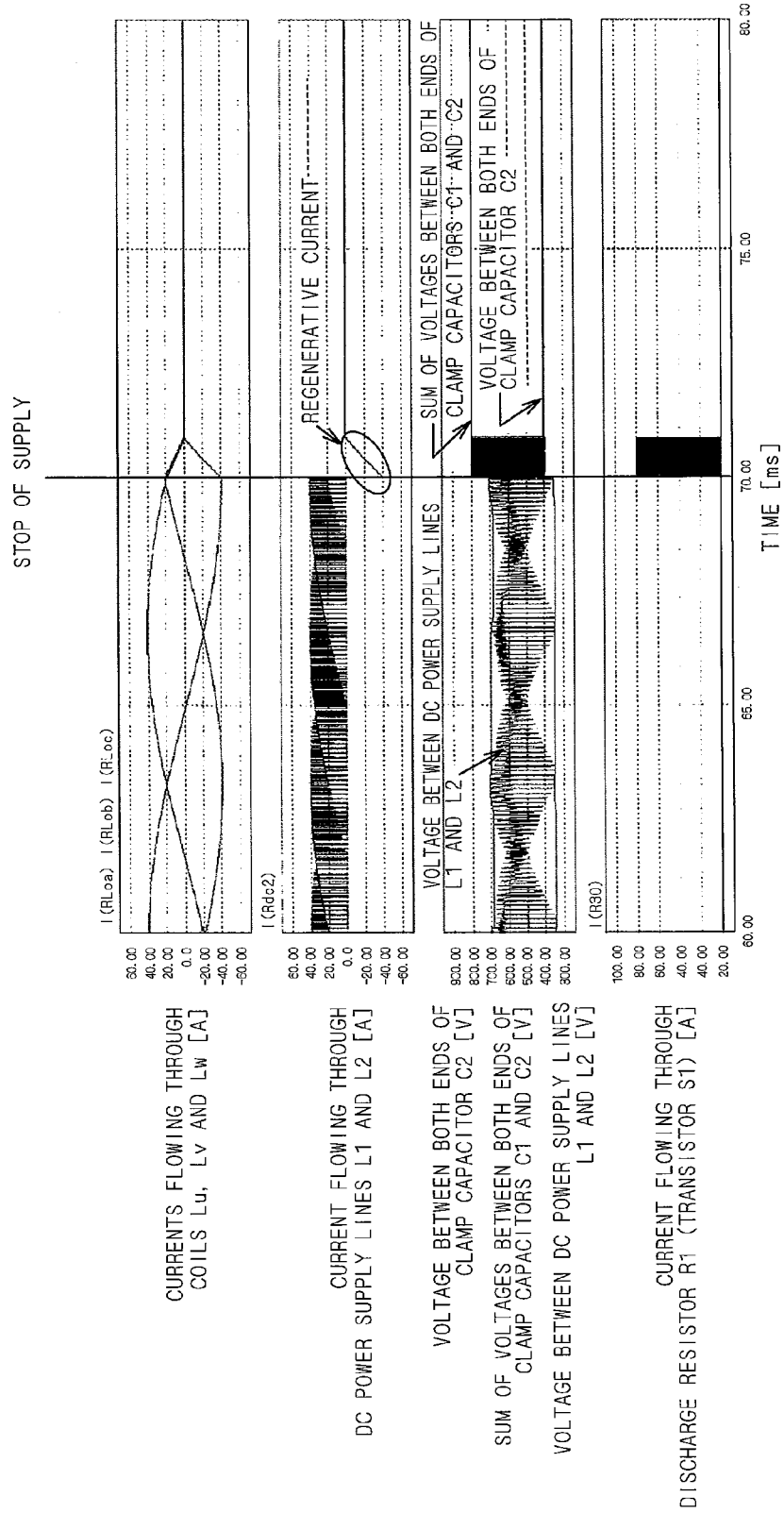
FIG. 7 is another graph showing currents flowing through coils included in a motor, currents flowing through DC power supply lines, voltage between both ends of one clamp capacitor, voltages between both ends of a pair of clamp capacitors, voltage between the DC power supply lines, and current flowing through a discharge resistor (transistor) in the motor driving device according to the second embodiment.
Figure 9:
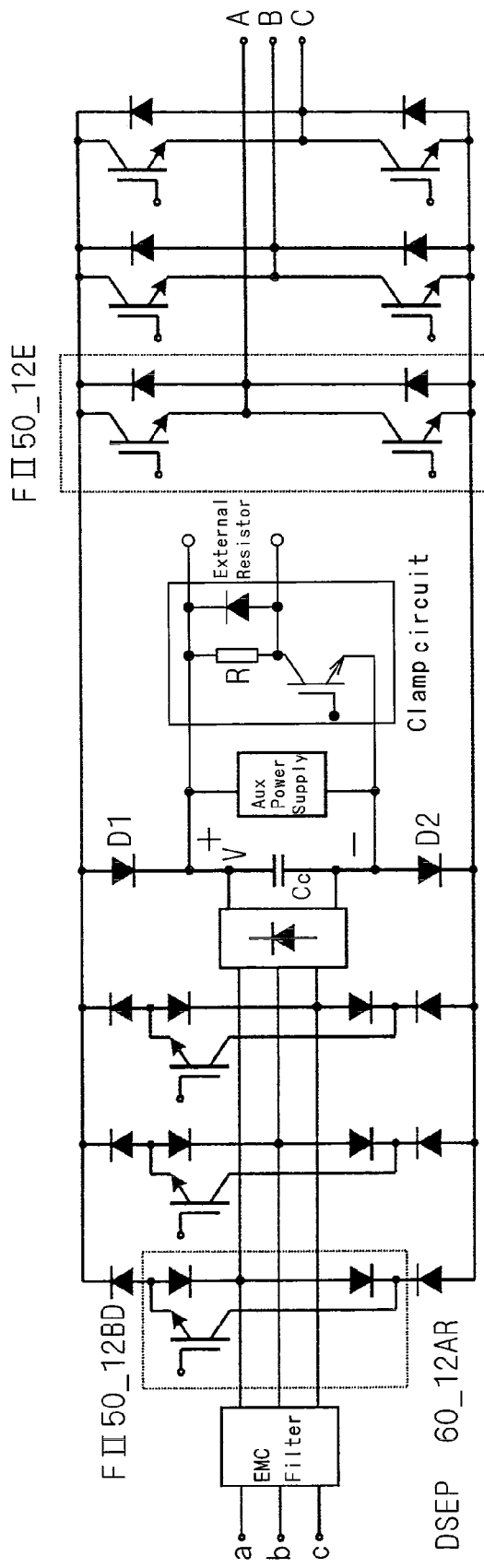
FIG. 9 is a diagram showing a power converting apparatus of Non-Patent Document 1.
Figure 10:
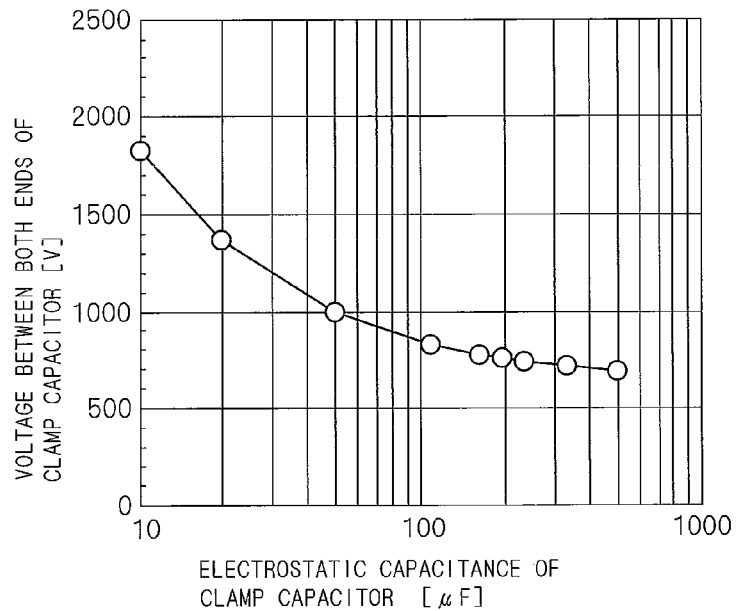
FIG. 10 is a graph showing a relationship between electrostatic capacitance of clamp capacitor and a voltage between both ends of the clamp capacitor.
Figure 11:
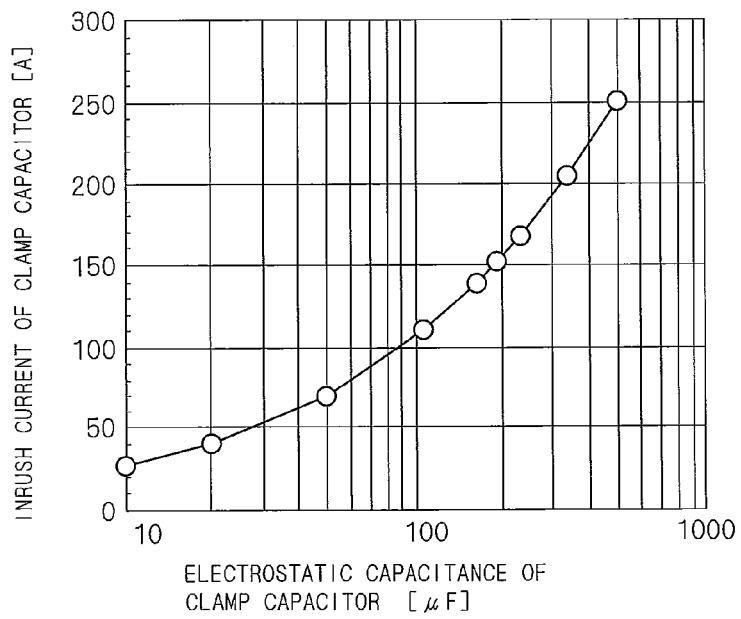
FIG. 11 is a graph showing a relationship between the electrostatic capacitance of the clamp capacitor and inrush current of the clamp capacitor.

FIG. 7 shows the results of a case where the power supply voltage Vs of the power supply E1 is 400 V, the maximum value Imax of the regenerative current is 40 A, the resistance value r1 of the discharge resistor R1 is 5Ω, and the reference voltage Vref-h is 400 V, which satisfy Expression (9).

For example, at time 70 ms, the regenerative current from the motor 5 is supplied to the clamp capacitors C1 and C2, whereby the voltages between both ends of the clamp capacitors C1 and C2 rise (see FIG. 7). Then, for example, the voltage Vc1 between both ends of the clamp capacitor C2 exceeds the reference voltage Vref-h, and thus the transistor S1 is brought into conduction.

On this occasion, the voltage drop Vr1 of the discharge resistor R1, which results from only the regenerative current Imax, is 200 V (=5Ω×40 A), and thus the voltage drop Vr1 is smaller than the voltage Vc1 (=reference voltage Vref-h=400 V) between both ends of the clamp capacitor C2. In this case, a value of the current flowing through the discharge resistor R1 is determined from the relationship between the voltages between both ends of the clamp capacitors C1 and C2 and the resistance value r1. In other words, discharging of the clamp capacitors C1 and C2 to the discharge resistor R1 is started. Upon discharging of the clamp capacitors C1 and C2, the regenerative current and the discharging currents from the clamp capacitors C1 and C2 flow through the discharge resistor R1. Note that the current flowing through the discharge resistor R1 on this occasion has a obtained by dividing the voltages between both ends of the clamp capacitors C1 and C2 by the resistance value R1 (=reference voltage Vref-h/ resistance value r1).

After that, the voltages between both ends of the clamp capacitors C1 and C2 decrease to fall below the reference voltage Vref-L, whereby the transistor S1 is brought into non-conduction. Then, the regenerative current flows through the clamp capacitors C1 and C2 to charge them, and the transistor S1 is brought into conduction when the voltage Vc1 between both ends of the clamp capacitor C2 again exceeds the reference voltage Vref-h, with the result that the clamp capacitors C1 and C2 are discharged.

As described above, the clamp capacitors C1 and C2 can be discharged almost at the same time with the conduction of the transistor S1, and thus the period of time in which the transistor S1 is in conduction can be reduced, which reduces the time rating of the transistor S1.

Note that the voltage (voltage drop Vr1) applied to the discharge resistor R1 is constant, which is almost the same as the voltages between both ends (reference voltage Vref-h) of the clamp capacitors C1 and C2, and hence larger loss is generated in the discharge resistor R1 as the resistance value r1 decreases. Therefore, the resistance value r1 is desirably as large as possible. That is, the resistance value r1 is desirably a value obtained by dividing the reference voltage Vref-h by the maximum value of the current flowing through the discharge resistor R1.

Third Embodiment

A conceptual configuration diagram of a motor driving device according to a third embodiment is the same as that of FIG. 1 except for the clamp circuit 2. FIG. 8 is a conceptual configuration diagram of the clamp circuit 2 included in the motor driving device according to the third embodiment.

Compared with the clamp circuit 2 shown in FIG. 1, the clamp circuit 2 further includes a clamp capacitor C3 and diodes D6 to D8. The clamp capacitor C3 is connected between the diode D1 and the clamp capacitor C2. Between the clamp capacitors C2 and C3, the diode D6 has an anode connected to the clamp capacitor C3 and a cathode connected to the clamp capacitor C2 and the diode D2. The diode D7 has an anode connected to a point between the diode D1 and the clamp capacitor C3 and a cathode connected to the DC power supply line L1. A diode D8 has an anode connected to the DC power supply line L2 and a cathode connected to a point between the diode D6 and the clamp capacitor C3.

According to the clamp circuit 2 having the above-mentioned configuration, the clamp capacitors C1 to C3 are charged in the state of being connected in series with each other and discharged in the state of being connected in parallel with each other by the rectifying functions of the diodes D1 to D3 and D6 to D8.

As a result, the voltage between the DC power supply lines L1 and L2 is divided by the clamp capacitors C1 to C3, with the result that the voltages applied to the clamp capacitors C1 to C3 are reduced further. Accordingly, the reference voltage Vref-h can also be reduced.

Further, the resistance value r1 of the discharge resistor R1 is set to a value equal to or smaller than the value obtained by dividing the reference voltage Vref-h by the maximum value Imax of the current flowing through the discharge resistor R1, whereby the electrostatic capacitance (=reference voltage Vref-h×reference voltage Vref-h/resistance value r1) required by the discharge resistor R1 can be reduced further. This is because the reference voltage Vref-h can be reduced further.

Note that in the motor driving devices described in the first to third embodiments, the brake circuit 3 and the voltage-source inverter 4 may be composed of a power integrated module (PIM). In this case, those can be manufactured integrally and are widely applied to an indirect AC power converting apparatus, whereby a motor driving device can be configured to be compact in size at inexpensive cost.

While the invention has been shown and described in detail, the foregoing description is in all aspects illustrative and not restrictive. It is therefore understood that numerous modifications and variations can be devised without departing from the scope of the invention.

The invention claimed is:

1. A direct power converting apparatus, comprising:
   a positive-side DC power supply line;
   a negative-side DC power supply line to which a potential lower than a potential applied to said positive-side DC power supply line is applied;
   input capacitors each connected between ones of a plurality of input lines connected to a multi-phase AC power supply and functioning as a power supply;
   a current-source power converter converting a multi-phase AC voltage input from said input lines into a square-wave-shape DC voltage having two potentials, and supplying said positive-side DC power supply line and said negative-side DC power supply line with said DC voltage;
   a voltage-source power converter converting said DC voltage having two potentials between said positive-side DC power supply line and said negative-side DC power supply line into a square-wave-shape AC voltage, and outputting said square-wave-shape AC voltage to an inductive multi-phase load;
   a first capacitance device having one end connected to said positive-side DC power supply line;
   a second capacitance device connected to another end of said first capacitance device and said negative-side DC power supply line;
   a first diode device having, between said first capacitance device and said second capacitance device, an anode connected to said first capacitance device and a cathode connected to said second capacitance device;
   a second diode device having an anode connected to a point between said second capacitance device and said first diode device and a cathode connected to said positive-side DC power supply line;
   a third diode device having an anode connected to said negative-side DC power supply line and a cathode connected to a point between said first capacitance device and said first diode;
   a discharge resistor connected between said positive-side DC power supply line and said negative-side DC power supply line; and
   a switching device connected in series with said discharge resistor between said positive-side DC power supply line and said negative-side DC power supply line, being brought into conduction when a voltage between both ends of said first capacitance device or said second capacitance device exceeds a first predetermined value, and being interrupted when the voltage falls below a second predetermined value.

2. The direct power converting apparatus according to claim 1, wherein a resistance value of said discharge resistor is equal to or smaller than a value obtained by dividing said first predetermined value by a maximum value of a current flowing through said discharge resistor.

3. The direct power converting apparatus according to claim 1, further comprising:
   a third capacitance device connected between said first diode device and said second capacitance device;
   a fourth diode device having, between said second capacitance device and said third capacitance device, an anode connected to said third capacitance device and a cathode connected to said second capacitance device and said second diode device;
   a fifth diode device having an anode connected to a point between said first diode device and said third capacitance device and a cathode connected to said positive-side DC power supply line; and
   a sixth diode device having an anode connected to said negative-side DC power supply line and a cathode connected to a point between said fourth diode device and said third capacitance device.

4. The direct power converting apparatus according to claim 2, further comprising:
   a third capacitance device connected between said first diode device and said second capacitance device;
   a fourth diode device having, between said second capacitance device and said third capacitance device, an anode connected to said third capacitance device and a cathode connected to said second capacitance device and said second diode device;
a fifth diode device having an anode connected to a point between said first diode device and said third capacitance device and a cathode connected to said positive-side DC power supply line; and
a sixth diode device having an anode connected to said negative-side DC power supply line and a cathode connected to a point between said fourth diode device and said third capacitance device.

5. The direct power converting apparatus according to claim 1, wherein said voltage-source power converter and said switching device are composed of a power integrated module.

6. The direct power converting apparatus according to claim 2, wherein said voltage-source power converter and said switching device are composed of a power integrated module.

7. The direct power converting apparatus according to claim 3, wherein said voltage-source power converter and said switching device are composed of a power integrated module.

8. The direct power converting apparatus according to claim 4, wherein said voltage-source power converter and said switching device are composed of a power integrated module.

9. The direct power converting apparatus according to claim 5, wherein said voltage-source power converter and said switching device are composed of a power integrated module.

10. The direct power converting apparatus according to claim 1, wherein said anode of said third diode device is connected to said negative-side DC power at a point between said second capacitance device and said switching device.

11. The direct power converting apparatus according to claim 3, wherein
said cathode of said fifth diode device is connected to said positive-side DC power supply line at a point between said first capacitance device and said current source converter, and
said anode of said sixth diode device is connected to said negative-side DC power supply line at a point between said second capacitance device and said switching device.

12. The direct power converting apparatus according to claim 4, wherein
said cathode of said fifth diode device is connected to said positive-side DC power supply line at a point between said first capacitance device and said current source converter, and
said anode of said sixth diode device is connected to said negative-side DC power supply line at a point between said second capacitance device and said switching device.

13. The direct power converting apparatus according to claim 1, wherein said cathode of said second diode device is connected to said positive-side DC power supply line at a point between said first capacitance device and said current source converter.

* * * * *